Jan. 16, 1962  R. M. ALLYN ETAL  3,016,970
INTERPRETATION OF SEISMIC RECORDS
Filed Nov. 17, 1958  6 Sheets-Sheet 4

INVENTORS
S. D. ELLIOTT
R. M. ALLYN
BY
Hudson & Young
ATTORNEYS

Jan. 16, 1962   R. M. ALLYN ETAL   3,016,970
INTERPRETATION OF SEISMIC RECORDS
Filed Nov. 17, 1958   6 Sheets-Sheet 5

INVENTORS
S.D. ELLIOTT
R.M. ALLYN
BY
Hudson & Young
ATTORNEYS

INVENTORS
S. D. ELLIOTT
R. M. ALLYN
BY Hudson & Young
ATTORNEYS

United States Patent Office 3,016,970
Patented Jan. 16, 1962

3,016,970
INTERPRETATION OF SEISMIC RECORDS
Robert M. Allyn and Sam D. Elliott, Bartlesville, Okla., assignors to Phillips Petroleum Company, a corporation of Delaware
Filed Nov. 17, 1958, Ser. No. 774,334
3 Claims. (Cl. 181—.5)

This invention relates to a method of seismic exploration wherein a plurality of separate vibration records obtained from a common subterranean reflection point or area are added in a manner so as to amplify the desired reflections and minimize extraneous noise vibrations.

Seismic exploration relates to a method of obtaining information regarding subterranean earth formations by transmitting vibrations from a first point at or near the surface of the earth downwardly into the formations and measuring the reflected or refracted vibrations at one or more second points spaced from the first point. It is common practice to detonate an explosive charge to produce the vibrations. A plurality of seismometers are disposed in a predetermined geometric array in spaced relationship from the shot hole. The vibrations incident upon the seismometers are converted into counterpart electrical signals which are amplified and recorded. By timing the arrivals of selected reflections, valuable information can often be obtained regarding the depth and slope of subterranean earth formations. Unfortunately, however, extraneous vibrations normally are present which tend to obscure the recognition of the desired reflected signals.

In many areas, an unconsolidated or weathered layer exists immediately beneath the surface of the earth. This layer generally transmits vibrations at velocities substantially less than the velocities of transmission in the lower regions. A portion of the energy transmitted downwardly is reflected back to the surface from the lower boundary of this weathered layer. This reflected energy is partially transmitted downwardly again at the surface, and these reflections continue until a portion of the energy reaches the seismometers. In some areas, these multiple reflections often arrive at the seismometers with greater amplitudes than do reflections from lower boundaries which are to be mapped. It thus becomes important to eliminate these multiple reflections from the seismic records.

It has recently been proposed to combine a plurality of seismic records in such a manner that reflections from common subterranean formations are superimposed in the composite record. The present invention provides an improved procedure of this type wherein the individual records are displaced from one another and subsequently combined so that the mutliple reflections are cancelled and the desired reflections are amplified.

Accordingly, it is an object of this invention to provide a procedure for recording and reproducing seismic signals in such a manner as to amplify the desired reflections and minimize random vibrations.

Another object is to provide a procedure for transforming seismic records so as to eliminate multiple reflections.

Other objects, advantages and features of the invention should become apparent from the following detailed description which is taken in conjunction with the accompanying drawing in which.

Figure 1:
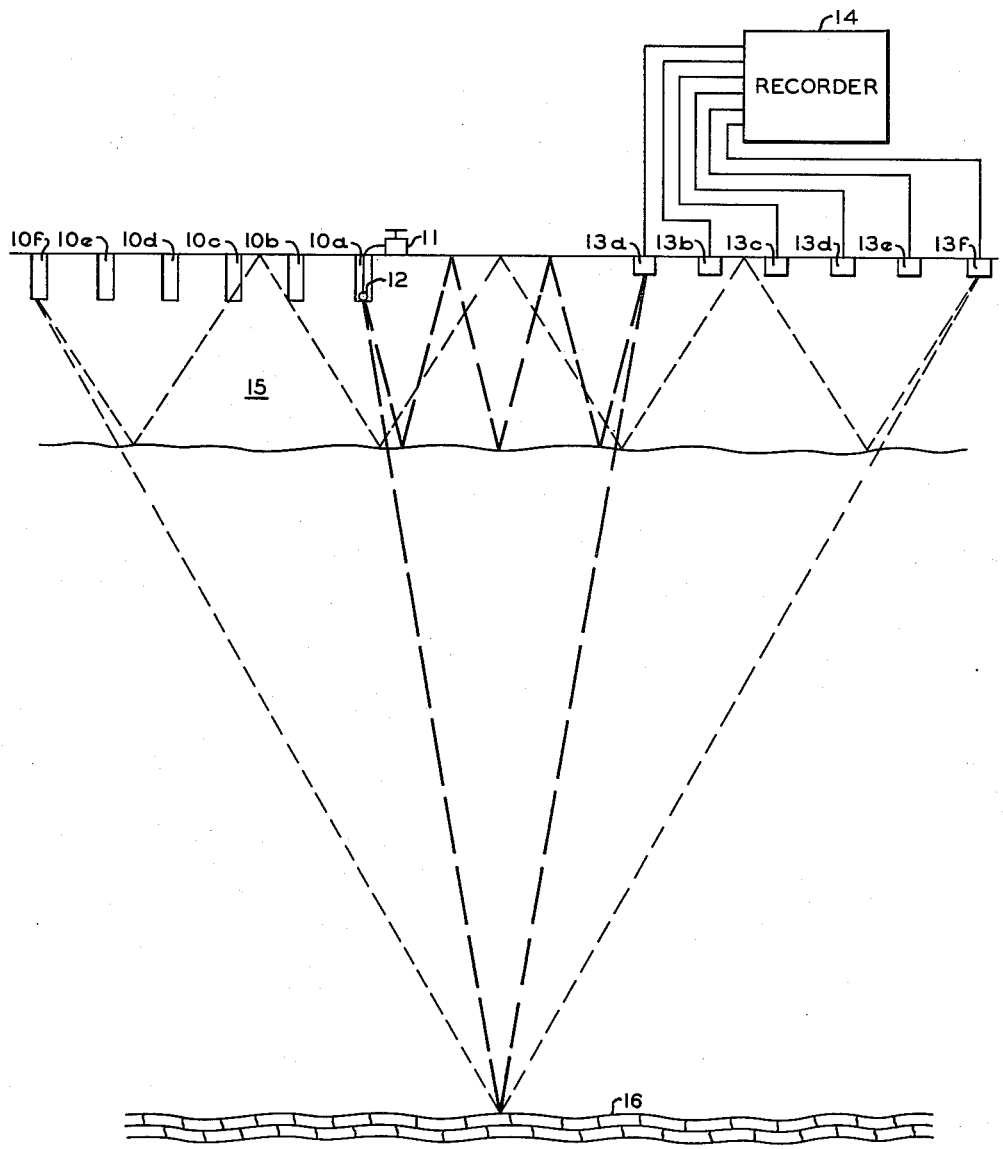
FIGURE 1 is a schematic representation of the locations of shot points and seismometers which can be employed to carry out the method of this invention.

Referring now to the drawing in detail and to FIGURE 1 in particular, there is shown a series of spaced shot holes 10a, 10b, 10c, 10d, 10e and 10f which are positioned along a common line. A detonator 11 is connected to an explosive charge 12 which is positioned within shot hole 10a. A series of seismometers 13a, 13b, 13c, 13d, 13e and 13f are spaced from one another and from the shot holes along the same line. These seismometers can represent single seismometers, or groups of seismometers, as is well known in the art. The seismometers are connected to a recorder 14 which preferably comprises a multi-channel magnetic drum type recorder. This type of recorder is preferred because the signals can readily be reproduced for transformation in accordance with this invention.

An unconsolidated or weathered layer 15 is shown immediately beneath the surface of the earth. A rock bed 16 is shown a substantial distance beneath this weathered layer. When explosive charge 12 is detonated, vibrations are transmitted downwardly and are reflected from bed 16 back to seismometer 13a. Additional vibrations are reflected a number of times through the weathered layer, as illustrated, to strike seismometer 13a. It should thus be evident that the signal recorded from this seismometer contains both the desired reflections from bed 16 and multiple reflections through the weathered layer.

Additional explosive charges are detonated in sequence in the remainder of the shot holes and vibrations are received by the corresponding seismometers. For example, vibrations emitted from shot hole 10f are received by seismometer 13f. In actual practice, vibrations from each shot hole are received by a plurality of seismometers. However, in order to simplify the explanation of this invention, it will be assumed that seismometers 13a to 13f receive only vibrations from respective shot holes 10a to 10f. It should be noted that these vibrations are reflected from a common region on bed 16.

Figure 2:
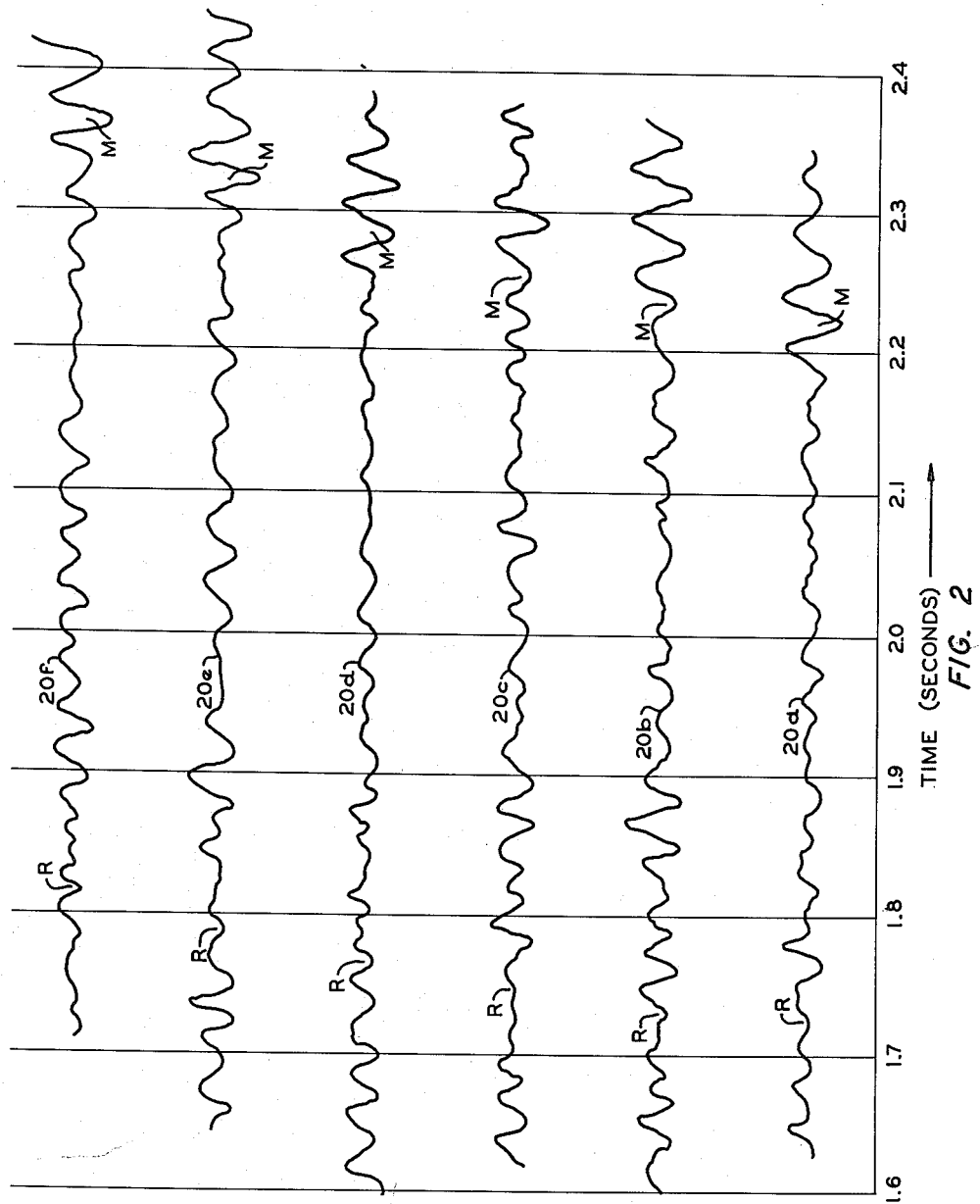
FIGURES 2 to 6 are graphical representations of the manner in which the seismic records are transformed by the process of this invention.

FIGURE 2 is a graphical representation of typical signals which are recorded from vibrations received by the individual seismometers. Curves 20a to 20f represent vibrations received by respective seismometers 13a to 13f. In these curves, it is assumed that reflections from bed 16 occur at times between 1.7 and 1.9 seconds after the respective explosive charges are detonated. These reflections are designated by the letter "R" on each of the curves. It is also assumed that the multiple reflections arrive at times between 2.2 and 2.4 seconds after the respective explosive charges are detonated. These multiple reflections are designated by the letter "M." It is further assumed that the weathered layer transmits vibrations at an average velocity of approximately 6500 feet per second, whereas the average velocity of transmission through the lower regions is approximately 9,000 feet per second. The horizontal distances from respective shot holes 10a to 10f to the corresponding seismometers and 900 feet, 1800 feet, 2700 feet, 3600 feet, 4500 feet and 5400 feet, respectively.

From an inspection of FIGURE 1, it is evident that the vibrations which travel from shot hole 10f to seismometer 13f travel a longer path than do the vibrations from shot hole 10a which are received by seismometer 13a. The first step in the process of this invention involves combining the several records so that all the reflections from bed 16 are superimposed. This requires that the individual records be displaced by varying amounts to correct for the different travel paths. The exact correction to be applied is somewhat a "trial and error" procedure because the exact depth of reflected bed 16 is not known. However, a series of adjustments can readily be made in order to obtain the proper amount of correction to be applied. Such a series of adjustments can be made in a rapid manner when the signals originally are recorded on a magnetic drum. For any given assumption of the depth of the reflecting bed 16, and thus the travel time for a primary reflection, the corresponding displacements for the individual seismometer signals can readily be computed from the horizontal spacings between the seismometers and the shot points and the average velocity of transmission through the formations. These transmission velocities generally can be obtained by procedures well known in the art, such as by drilling an exploratory well and detonating a series of charges at various depths. The table which follows shows the angularity of path correction times to be applied for various assumed depths of the reflecting bed 16.

| Horizontal Distance—Shot Point to Geophone (Feet) | | | | | | | | | | | | | |
|---|---|---|---|---|---|---|---|---|---|---|---|---|---|
| 450 | 900 | 1,350 | 1,800 | 2,250 | 2,700 | 2,150 | 3,600 | 4,050 | 4,500 | 4,950 | 5,400 | 6,000 | |
| Angularity of Path Correction (Seconds) | | | | | | | | | | | | | |
| .003 | .008 | .017 | .030 | .046 | .066 | .088 | .115 | .143 | .175 | .210 | .247 | .300 | |
| .003 | .008 | .015 | .027 | .042 | .060 | .082 | .106 | .133 | .163 | .196 | .230 | .280 | |
| .003 | .007 | .014 | .025 | .038 | .056 | .075 | .098 | .121 | .150 | .181 | .213 | .260 | |
| .003 | .007 | .013 | .023 | .036 | .051 | .069 | .090 | .113 | .138 | .167 | .197 | .240 | |
| .003 | .006 | .012 | .021 | .032 | .046 | .063 | .082 | .103 | .127 | .152 | .180 | .220 | |
| .003 | .006 | .011 | .019 | .029 | .042 | .057 | .074 | .093 | .115 | .138 | .163 | .200 | |
| .003 | .005 | .010 | .017 | .026 | .037 | .051 | .066 | .083 | .103 | .124 | .147 | .180 | |
| .003 | .005 | .009 | .016 | .025 | .036 | .048 | .063 | .079 | .097 | .117 | .139 | .170 | |
| .002 | .004 | .009 | .015 | .023 | .033 | .045 | .058 | .074 | .091 | .110 | .130 | .160 | |
| .002 | .004 | .008 | .014 | .021 | .031 | .042 | .055 | .069 | .085 | .103 | .122 | .150 | |
| .002 | .004 | .008 | .013 | .020 | .029 | .039 | .051 | .065 | .079 | .096 | .114 | .140 | |
| .002 | .003 | .007 | .012 | .019 | .027 | .036 | .048 | .060 | .074 | .089 | .106 | .130 | |
| .002 | .003 | .007 | .011 | .017 | .025 | .034 | .044 | .055 | .068 | .082 | .097 | .120 | |
| .001 | .003 | .006 | .010 | .015 | .023 | .030 | .040 | .050 | .062 | .075 | .090 | .110 | |
| .001 | .003 | .005 | .009 | .014 | .021 | .028 | .036 | .046 | .057 | .068 | .081 | .100 | |
| .001 | .002 | .005 | .008 | .013 | .018 | .025 | .036 | .042 | .051 | .062 | .073 | .090 | |
| .001 | .002 | .004 | .007 | .012 | .016 | .022 | .029 | .037 | .045 | .055 | .065 | .080 | |
| .001 | .002 | .004 | .007 | .010 | .014 | .020 | .026 | .032 | .040 | .048 | .057 | .070 | |
| .000 | .002 | .003 | .006 | .008 | .012 | .017 | .023 | .027 | .034 | .041 | .049 | .060 | |
| .000 | .001 | .003 | .005 | .007 | .010 | .014 | .018 | .023 | .028 | .034 | .041 | .050 | |
| .000 | .001 | .003 | .004 | .006 | .008 | .011 | .014 | .018 | .023 | .027 | .032 | .040 | |
| .000 | .001 | .002 | .003 | .005 | .006 | .008 | .011 | .014 | .017 | .020 | .024 | .030 | |
| .000 | .001 | .002 | .003 | .004 | .005 | .006 | .007 | .009 | .011 | .014 | .016 | .020 | |
| .000 | .001 | .001 | .001 | .002 | .002 | .003 | .003 | .005 | .006 | .007 | .008 | .010 | |

Each horizontal line of the foregoing table represents an assumed depth of reflecting bed 16, which depths increase downwardly in the table. For a given assumed velocity, the differences in travel times can easily be computed by simple trigonometry. It is evident that the angularity of path corrections become less at greater depths because the difference between the total travel times becomes less.

Figure 3:
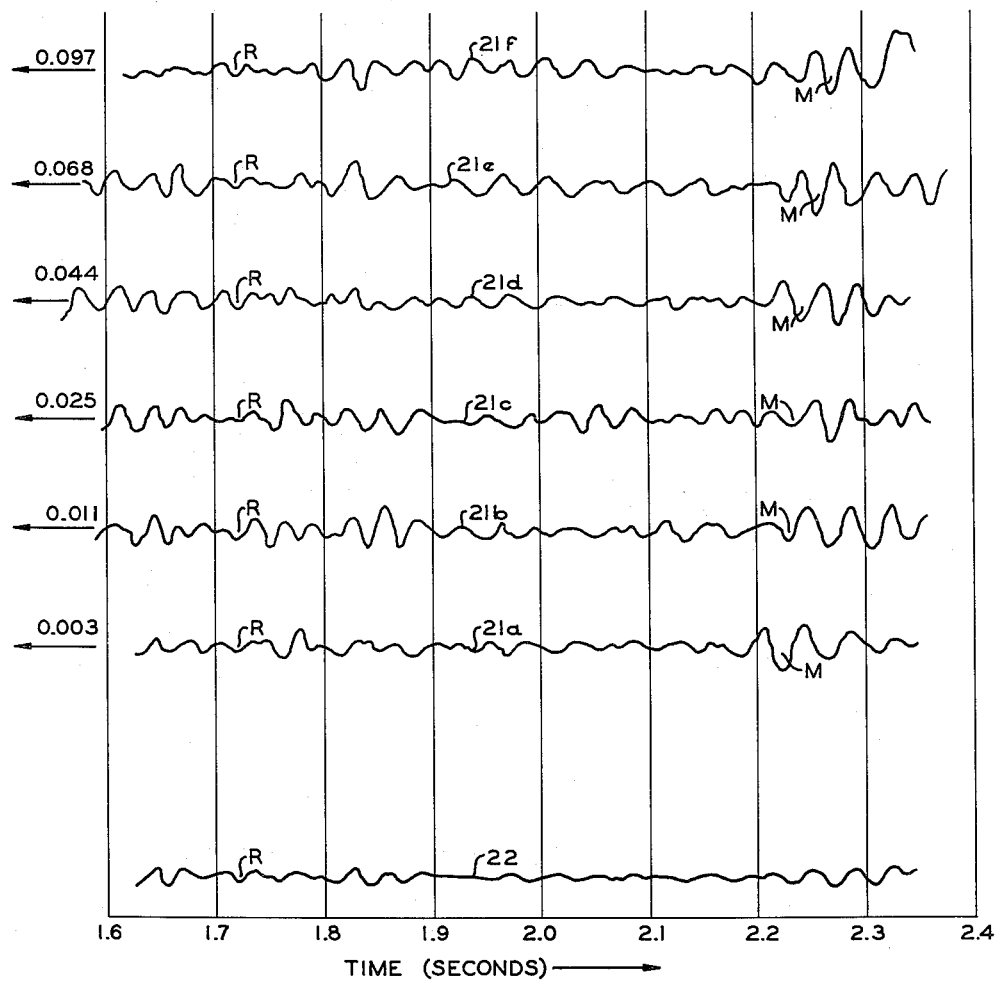

With regard to the records illustrated in FIGURE 2, it will be assumed that the corrections shown in the thirteenth line of the table are proper to align the primary reflections. As previously discussed, the selection of these particular corrections is generally a "trial and error" procedure to obtain the best corrections. The curves of FIGURE 2 are then displaced by the times illustrated in FIGURE 3 so that curves 20a to 20f are reproduced as respective curves 21a to 21f. It can thus be seen that the reflections "R" now occur at the same time. The curves 21a to 21f of FIGURE 3 are then summed, and reduced in amplitude by a factor of one-sixth, to provide the composite record of curve 22. It can thus be seen that the primary reflections are emphasized whereas the multiple reflections are reduced in magnitude.

Figure 4:
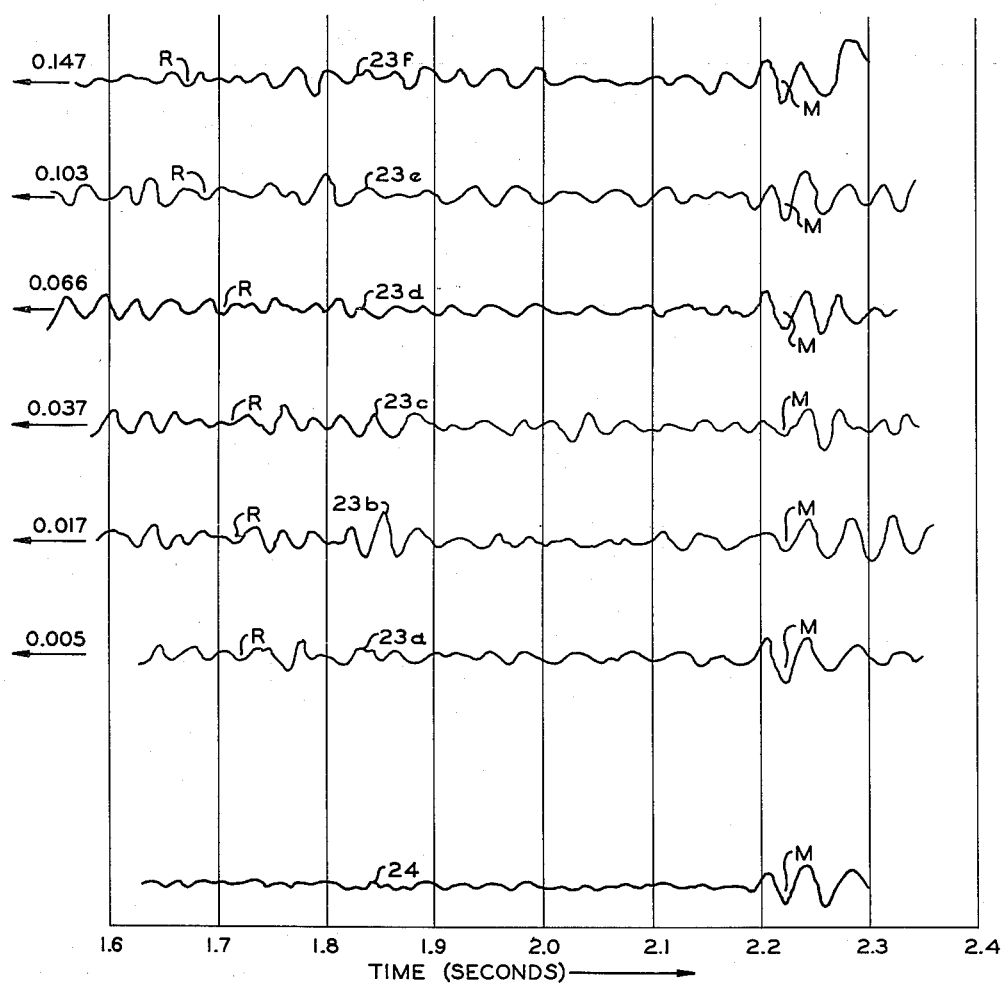

The next step in the process of this invention involves combining the original records of FIGURE 2 in such a manner that the multiple reflections are superimposed. In order to accomplish this result, it is assumed that the angularity of path corrections shown in the seventh line of the table are proper. The curves 20a to 20f of FIGURE 2 are displaced by the times illustrated in FIGURE 4 to provide respective curves 23a to 23f. These curves are then summed and reduced in amplitude by a factor of one-sixth to provide curve 24. The multiple reflections are amplified in this curve 24 of FIGURE 4, whereas the primary reflections are reduced in amplitude.

Figure 5:
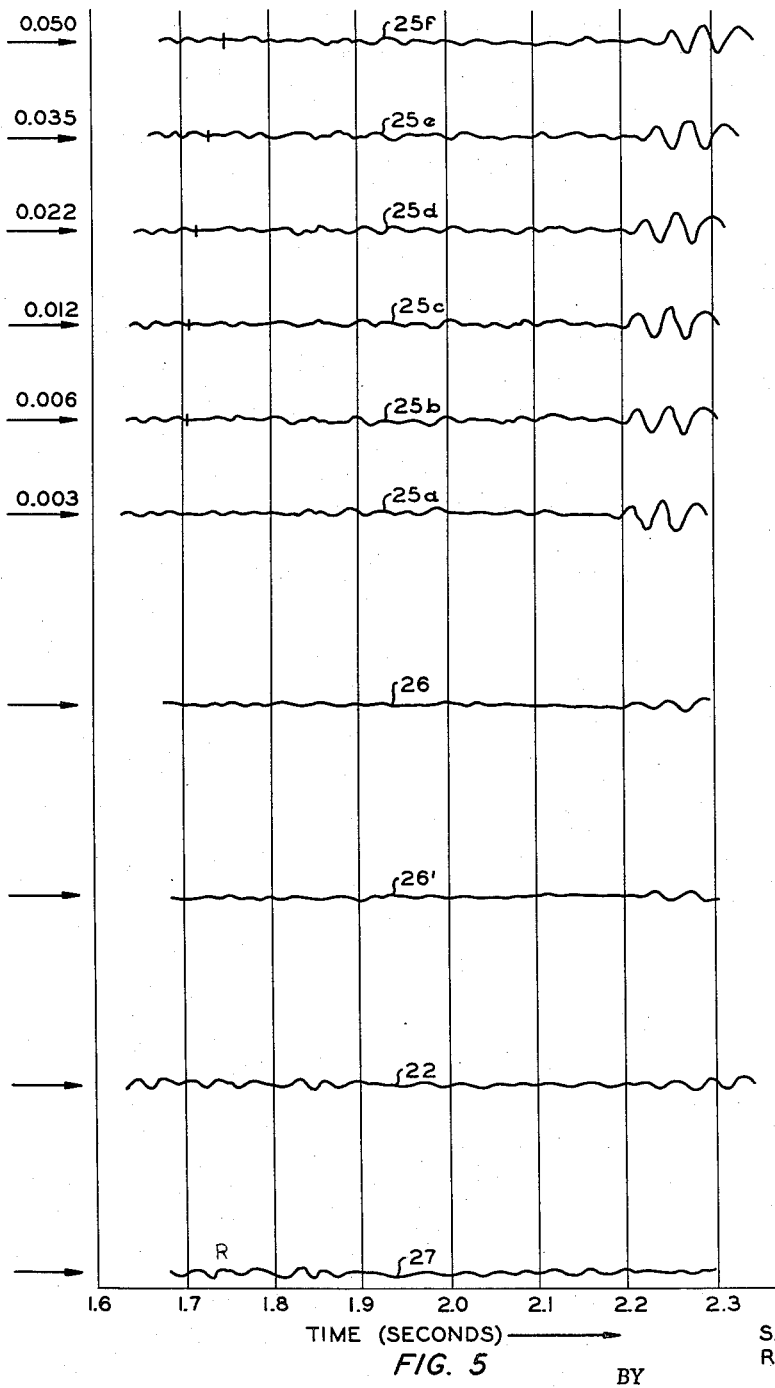

The next step involves recording curve 24 six separate times after being displaced amounts equal to the differences between the two angularity of path corrections previously applied. The resulting curves 25a to 25f, together with the displacement times, are illustrated in FIGURE 5. Curves 25a to 25f are then summed and reduced in amplitude by a factor of one-sixth to provide curve 26. The final step of the process of this invention involves subtracting curve 26 from curve 22 of FIGURE 3. This is readily accomplished by inverting curve 26 to provide curve 26′ which is then summed with curve 22 to provide curve 27. From an inspection of curve 27 in FIGURE 5, it can readily be seen that the primary reflections appear in the record, whereas the multiple reflections are substantially eliminated.

Figure 6:
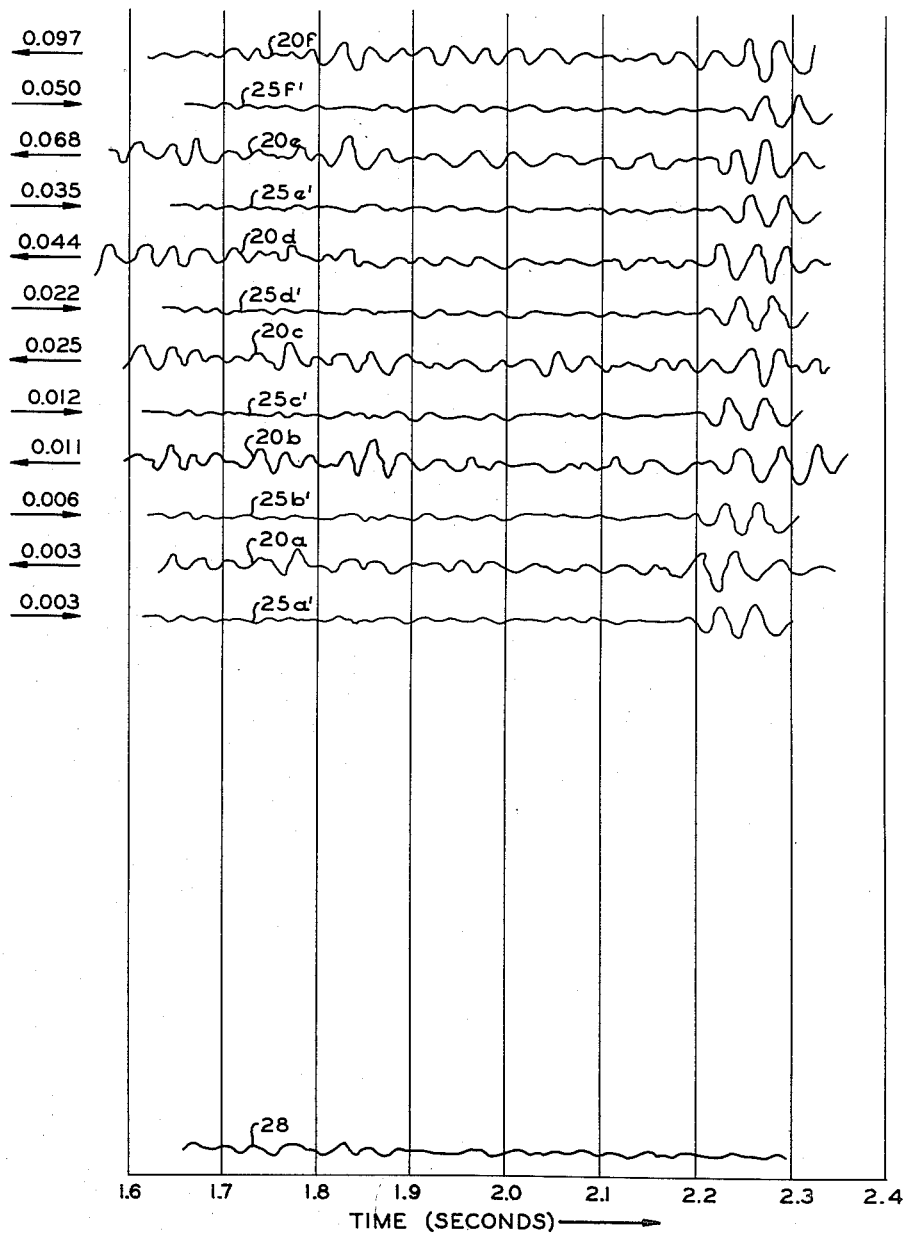

A second embodiment of the process of this invention is illustrated schematically in FIGURE 6. Curves 20a to 20f of FIGURE 2 are reproduced, and curves 25a to 25f of FIGURE 5 are reproduced as respective curves 25a′ to 25f′ of reversed polarity. The 12 curves of FIGURE 6 are then summed and reduced in amplitude by a factor of one-twelfth to provide curve 28. It should be evident that this process is equivalent to that previously described so that curve 28 corresponds to curve 27.

As previously mentioned, the manipulative steps of this invention can advantageously be performed by reproducing and combining the records with a magnetic tape or drum recorder. This permits a number of "trial and error" runs to be made in a short time to determine the correct displacements. However, the invention is not limited to any specific apparatus. It should be evident that the curves can be moved and combined manually by drafting procedures, if desired.

The process of this invention substantially eliminates multiple reflections from the final seismic record. The desired reflections are amplified so that they can be recognized more readily. As previously mentioned, it is necessary in the practice of this invention to make an arbitrary assumption as to the angularity of path corrections to be applied. However, a series of assumptions are made until the best possible curve is obtained.

While the invention has been described in conjunction with present preferred embodiments, it should be evident that it is not limited thereto.

What is claimed is:

1. The method of seismic surveying which comprises imparting to the earth acoustic vibrations at a plurality of spaced first points and making first records of reflections of said vibrations from a common subsurface area at a plurality of second points respectively spaced from said first points, said first records containing primary reflections from said common subsurface reflecting area and multiple reflections from reflecting areas above said common subsurface area, and combining said first records with first portions of the first records which appear to be records of primary reflections from said common subsurface area substantially coincident so as to make a composite second record wherein the first portions of the resulting composite record remain substantially intact and the remaining portions are substantially neutralized, said combining being accomplished by producing a plurality of third records, wherein said primary reflections occur at the same time relative to one another, which represent said first records displaced with respect to one another by preselected first amounts, producing a plurality of fourth records, wherein said secondary reflections occur at the same time relative to one another, which represent said first records displaced with respect to one another by preselected second amounts, summing said fourth records to form a fifth record, producing a plurality of sixth records by displacing said fifth record a plurality of times from a reference point by amounts equal to the respective differences between said second and first amounts, summing said third records, summing said sixth records, and subtracting the sum of said sixth records from the sum of said third records to obtain said composite second record.

2. The method of seismic surveying which comprises imparting to the earth acoustic vibrations at a plurality of spaced first points and making first records of reflections of said vibrations from a common subsurface area at a plurality of second points respectively spaced from said first points, said first records containing primary reflections from said common subsurface reflecting area and multiple reflections from reflecting areas above said common subsurface area, and combining said first records with first portions of the first records which appear to be records of primary reflections from said common subsurface area substantially coincident so as to make a composite second record wherein the first portions of the resulting composite record remain substantially intact and the remaining portions are substantially neutralized, said combining being accomplished by producing a plurality of third records, wherein said primary reflections occur at the same time relative to one another, which represent said first records displaced with respect to one another by preselected first amounts, producing a plurality of fourth records, wherein said secondary reflections occur at the same time relative to one another, which represent said first records displaced with respect to one another by preselected second amounts, summing said fourth records to form a fifth record, producing a plurality of sixth records by displacing said fifth record a plurality of times from a reference point by amounts equal to the respective differences between said second and first amounts, summing said third records, summing said sixth records, subtracting the sum of said sixth records from the sum of said third records to obtain said composite second record, and repeating the displacement, summing and establishing steps set forth above with different preselected amounts until the primary reflections in said composite second record are a maximum and the multiple reflections in the composite second record are a minimum.

3. The method of seismic surveying which comprises imparting to the earth acoustic vibrations at a plurality of spaced first points and making first records of reflections of said vibrations from a common subsurface area at a plurality of second points respectively spaced from said first points, said first records containing primary reflections from said common subsurface reflecting area and multiple reflections from reflecting areas above said common subsurface area and combining said first records with first portions of the first records which appear to be records of primary reflections from said common subsurface area substantially coincident so as to make a composite second record wherein the first portions of the resulting composite record remain substantially intact and the remaining portions are substantially neutralized, said combining being accomplished by producing a plurality of third records, wherein said primary reflections occur at the same time relative to one another, which represent said first records displaced with respect to one another by preselected first amounts, producing a plurality of fourth records, wherein said secondary reflections occur at the same time relative to one another, which represent said first records displaced with respect to one another by preselected second amounts, summing said fourth records to form a fifth record, producing a plurality of sixth records by displacing said fifth record a plurality of times from a reference point by amounts equal to the respective differences between said second and first amounts, summing said third records, summing said sixth records, and subtracting the sum of said sixth records from the sum of said third records to obtain said composite second record.

References Cited in the file of this patent
UNITED STATES PATENTS

| | | |
|---|---|---|
| 2,243,730 | Ellis | May 27, 1941 |
| 2,732,906 | Mayne | Jan. 31, 1956 |
| 2,882,988 | Dobrin | Apr. 21, 1959 |
| 2,888,089 | Piety | May 26, 1959 |
| 2,907,400 | Swafford | Oct. 6, 1959 |